Dec. 2, 1924.
F. R. FISH
1,517,720
DRYING AND WINDING DEVICE FOR FISHING LINES
Filed Nov. 10, 1923
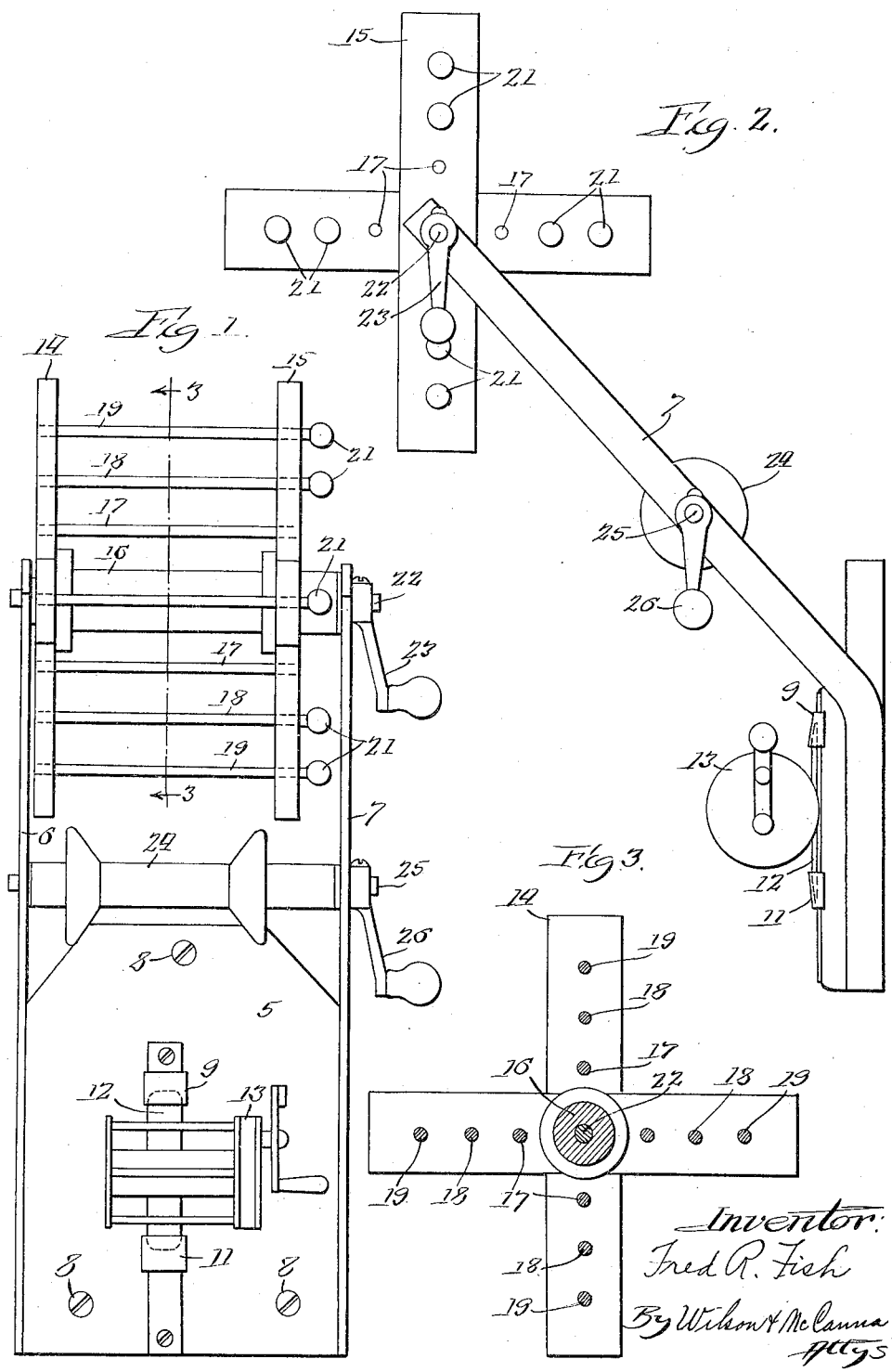
Inventor:
Fred R. Fish
By Wilson & McCanna
Attys Patented Dec. 2, 1924.

1,517,720

UNITED STATES PATENT OFFICE.

FRED R. FISH, OF ROCKFORD, ILLINOIS.

DRYING AND WINDING DEVICE FOR FISHING LINES.

Application filed November 10, 1923. Serial No. 673,918.

*To all whom it may concern:*

Be it known that I, FRED R. FISH, a citizen of the United States, residing at Rockford, in the county of Winnebago and State of Illinois, have invented certain new and useful Improvements in Drying and Winding Devices for Fishing Lines, of which the following is a specification.

This invention relates in general to fishing and has more particular reference to reels upon which fishing lines are adapted to be wound for drying.

The primary object of my invention is to provide as a new article of manufacture a portable device which may be easily hung up or supported in any convenient position ready for use, and which is equipped with a drying reel, a reverse winding reel and means for the attachment of a rod-reel in operative relation to the drying and reverse winding reels. According to my invention, the fisherman may remove his reel from the rod, attach the reel to this device, wind the line from the reel or to the reverse winding reel and from the latter onto the drying reel, so that after the line is dried, it may be wound directly on the rod reel with the line reversed end for end. All of these operations may be easily and quickly performed without removing any of the reels from the device; and the line will be reversed on the rod-reel as is desirable in order that wear will be substantially uniform throughout the length of the line.

Another object is to provide an article of this character having provision for the winding of more than one line on the reel, each line being wound independently of the other and on a separate series of reel pins.

A further object is to provide an article of the character described, constructed in such novel manner that it may be produced at a comparatively low cost and will serve in a practical and satisfactory manner, the purposes intended.

Other objects and attendant advantages will be appreciated by those skilled in this art as the invention becomes better understood by reference to the following description when considered in connection with the accompanying drawings, in which:

Fig. 1 is a front view of a portable line-winding device embodying my invention;

Fig. 2 is a side view of the device; and

Fig. 3 is a section through the drying reel taken on the line 3—3 of Fig. 1.

Referring, more particularly to the drawings, it will be observed that I have provided a portable frame consisting in this instance of a base portion 5 and a pair of brackets 6—7 attached to the sides of the base portion in laterally spaced relation and extending in angular relation thereto as shown plainly on Fig. 2 so that when said base portion is attached in an upright position to any suitable support, the brackets 6—7 will project forwardly, over-hanging said base portion. I prefer to make the base portion of wood and the brackets 6—7 of strap iron, and to mount said base portion in position by suitable fastening means such as wood screws 8.

Upon the base portion I have mounted means for detachably securing a rod reel in position. This means may be of any suitable or preferred construction; that shown being of a conventional design comprising a stationary and a slidable socket clip 9 and 11, respectively, adapted to receive the ends of the attachment plate 12 of a rod reel 13, this attachment means being arranged so that said reel is supported on a horizontal axis.

The drying reel interposed between and revolubly mounted on the outer ends of the brackets 6—7 is composed of end members designated generally by 14 and 15 of any suitable shape but preferably in the form of crossed wooden strips as shown, joined by a shaft portion 16 and a plurality of series of fingers or pins spaced circumferentially about said end portions. In this example, the innermost series of fingers 17 are fixed to the end members, and the next two outermost series 18 and 19 are removable endwise from the reel. For simplicity in construction, the end members 14 and 15 are drilled for the reception of the pins 18 and 19 and said pins are equipped respectively at one end with heads 21 adapted to be grasped by the fingers for facilitating removal of the pins. A shaft 22 passed through bearing holes in the brackets 6—7 and through the shaft portion 16 of the reel and fixed thereto, is equipped at one end with a hand crank 23 by means of which the reel may be revolved.

The reverse winding reel is interposed between the drying reel and the rod-reel and revolubly supported upon and between the brackets 6—7. This reverse winding reel designated generally by 24 may be of any suitable or preferred construction and for all practical purposes, need only be in the form of a spool or drum, as shown. This reel fixed to a shaft 25 is adapted to be revolved by a hand crank 26 on said shaft. In the use of my invention, the device or article in which it is embodied, may obviously be carried about from place to place as occasion may require, on a fishing expedition or otherwise and may be quickly and easily mounted in position ready for service.

When a fisherman desires to dry a line, the reel containing the line will be removed from the rod and remounted on the base 5 by means of the clips 9 and 11 in the position shown on the drawings. It is desired to wind the line onto the drying reel from the rod reel and after the line is dried, to rewind it onto the rod reel reversed end for end. Thus each end portion of the line will be alternately subjected to the strains and wear due to casting and the life of the line will be increased. The reversing may be done either before or after winding the line on the drying reel. In the former instance, the line will be wound onto the reel 24 directly from the rod reel 13 and will be wound from said reel 24 onto the drying reel so that after drying when the line is rewound onto the rod reel, it will be reversed as explained. When drying the line it may be wound on any of the different series of pines 17, 18 and 19, it being evident that when winding on any inner series, the one or more series at the outer side will be first removed. In this way, three separate lines each from a different rod reel, may be wound on the drying reel, as on an independent series of pins, thus facilitating the winding and unwinding and avoiding tangling one line with another.

It will be manifest that by constructing the several parts in the manner disclosed, a unitary article is produced in which the several reels are carried in co-operative relation so that the desired winding operations may be performed quickly and easily; and it will be further manifest that by reason of the simple construction and few parts making up this article, it may be manufactured and sold at a comparatively low cost.

It is believed that the foregoing conveys a clear understanding of the objects prefaced above and while I have illustrated but a single working embodiment, it should be understood that changes might be made in the construction and arrangement of parts without departing from the spirit and scope of the invention as expressed in the appended claims, in which:

I claim:

1. As a new article of manufacture, a portable frame equipped with a drying reel, a reverse winding reel, and means for attaching a rod-reel in operative relation to said drying and rewinding reels.

2. As a new article of manufacture, a portable frame, means on said frame for the attachment thereto of a rod-reel, and a drying reel and a reverse winding reel mounted on said frame in such relation to the rod-reel that a line may be wound directly from any one of said reels onto either of the remaining reels.

3. A drying reel of the character described comprising a supporting frame, means on the frame for the attachment of a rod-reel thereto, and a drying reel mounted on the frame in winding relation to said rod-reel, said drying reel comprising end members joined by an inner and an outer series of circumferentially spaced pins, the outer series of which is removable to permit winding a line on the inner series.

4. A drying reel of the character described comprising a frame formed of a base member adapted for attachment to a suitable support and a pair of laterally spaced brackets fixed at one end to the base member, means on the base member adapted for detachably holding a rod-reel in position thereon, a drying reel interposed between the outer end of said brackets and having a shaft revolubly mounted thereon, and a hand crank on one end of said shaft for revolving the reel, the drying reel having an inner and an outer series of circumferentially spaced pins, the outer series of pins being removable from the reel to permit winding on the inner series.

5. A drying reel of the character described comprising a frame formed of a base member adapted for attachment to a suitable support and a pair of laterally spaced brackets fixed at one end to the base member, means on the base member adapted for detachably holding a rod-reel in position thereon, a drying reel interposed between the outer end of said brackets and having a shaft revolubly mounted thereon, a hand crank on one end of said shaft for revolving the reel, the drying reel having an inner and an outer series of circumferentially spaced pins, the outer series of pins being removable from the reel to permit winding on the inner series, and a reverse winding reel interposed between said drying reel and rod-reel and revolubly supported between said brackets.

FRED R. FISH.